April 8, 1969      E. W. REED, JR      3,437,870

SCAN LINE MASKING SYSTEM

Filed Nov. 3, 1965      Sheet _1_ of 2

INVENTOR
EDWARD W. REED, JR.
BY Carpenter, Kinney & Coulter
ATTORNEYS

FIG. 4
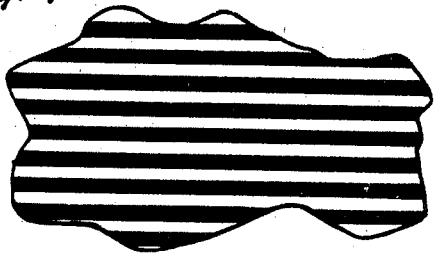
FIG. 5
- A ◯ Spot is round when A.C. voltage is zero.
- B ⬭ Spot is ellipse when A.C. voltage is maximum +.
- C ⬭ Spot is ellipse when A.C. voltage is maximum −.
FIG. 6
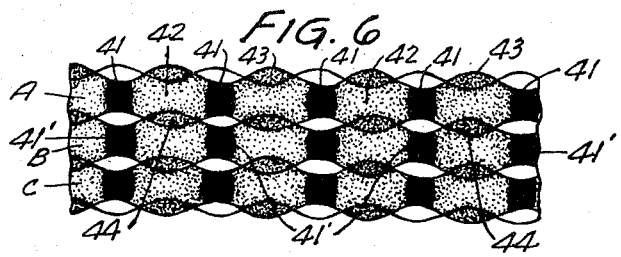
FIG. 7
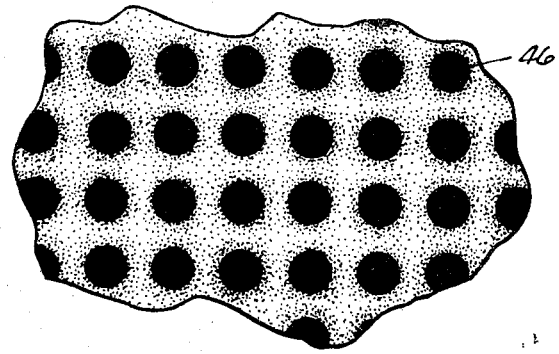
INVENTOR.
EDWARD W. REED, JR.
BY
Carpenter, Kinney & Coulter
ATTORNEYS

United States Patent Office 3,437,870
Patented Apr. 8, 1969

3,437,870
SCAN LINE MASKING SYSTEM
Edward W. Reed, Jr., St. Paul, Minn., assignor to Minnesota Mining and Manufacturing Company, St. Paul, Minn., a corporation of Delaware
Filed Nov. 3, 1965, Ser. No. 506,192
Int. Cl. H01j 29/56
U.S. Cl. 315—31                 9 Claims

ABSTRACT OF THE DISCLOSURE

A scan line masking system for use in an electron gun assembly adapted to generate an electron beam and scan the beam in a scan pattern composed of scan lines over a beam target area in response to synchronizing signals is provided wherein the cross-sectional shape of the electron beam is changed a plurality of times during each scan line to produce scan lines with spaced variations in width. In the preferred embodiment, changing means are located in the electron gun assembly between the beam generating means and the beam target area and comprise a stigmator for placing a symmetrical field around the path of the electron beam for urging the beam into a generally circular cross-sectional shape. An oscillator is operatively coupled to the stigmator for placing a high frequency signal across part of the stigmator for periodically varying the shape of the field, and thereby varying the cross-sectional shape of the beam. The oscillator may be phase locked to the synchronizing signals.

---

This invention relates to a method and means for masking or eliminating scan lines in a scan pattern and in one embodiment for masking the pattern produced by a scanning electron beam in producing a conventional television raster.

Scan patterns, produced by a modulated electron beam on a target area, are composed of a plurality of scan lines. For example, in the United States, a television raster or scan pattern comprises 525 scan lines produced from two interlaced television fields of 262.5 scan lines. The target area conventionally is a kinescope tube glass faceplate having a phosphor inner surface thereon which, when bombarded by the modulated electron beam, produces a scan pattern having a plurality of scan lines which defines a television picture.

Each scan line in such a pattern is produced by scanning the modulated electron beam across the target area. In the United States, the scan time of a modulated electron beam in scanning a horizontal scan line in a 525 line scan pattern is 63.5 microseconds. During each horizontal scan line, the shape of the spot of the modulated electron beam is maintained substantially constant. As the beam scans across the target area, the resulting scan line has an upper and lower edge. Between edges of each adjacent scan line, a median line having a width nearly equal to that of a scan line occurs which results in a scan pattern composed of unblended and discretely visible scan lines.

The discretely visible scan line edges and the median line have been blended together by a masking system, known as spot wobble, to produce a scan pattern having blended scan lines. As the electron beam was scanned in the horizontal direction, the spot of the modulated electron beam was cyclically scanned in the vertical direction, at a high frequency, into the median line. A scan pattern was produced wherein the upper and lower edges of each scan line appeared to be located substantially at the center of adjacent median lines.

In the spot wobble masking system, it was necessary that each scan line be equally spaced relative to adjacent scan lines. The equal spacing of the scan lines was accomplished by precisely positioning the electron beam in each scan line. The beam was precisely scanned in a vertical direction into adjacent median lines. The upper and lower edges of each resulting scan line was closely adjacent to but did not overlap the lower and upper edges respectively of adjacent scan lines. One disadvantage of the spot wobble masking system is that if a precise interlaced pattern is not maintained, the upper and lower edges of adjacent scan lines tend to overlap. The overlapping results in a new scan line pattern, having unblended scan lines, which appears much like the original scan pattern without spot wobble. Thus, the spot wobble masking system cannot tolerate overlapping of adjacent scan lines.

It is accordingly an object of the present invention to provide a method for masking scan lines in a scan pattern produced by a scanning electron beam.

Another object of this invention is to provide means for accomplishing scan line masking.

A further object of this invention is to provide a new and useful scan pattern.

Other and further objects of this invention will become apparent to those skilled in the art from a reading of the present specification taken together with the drawing.

In the scan line masking system of the present invention, the shape of the spot of the modulated electron beam is changed a plurality of times during a single scan. This produces a scan pattern comprising a plurality of scan lines wherein each scan line has a plurality of maximum and minimum variations in width about the center of the scan line. In some scan patterns, the scan lines may be phase locked such that the maximum variations in widths of adjacent scan lines are overlapped. The scan pattern produced by the scan line masking system of the present invention blends the edges of each adjacent scan line together.

In the embodiment of the present invention, the target area comprises a silver halide emulsion photographic film. However the target area could be the phosphor surface of a kinescope tube glass faceplate.

FIGURE 4 is a partial view of a conventional scan line pattern as in a video frame;

FIGURE 5 illustrates instantaneous cross-sectional shapes associated with a scanning electron beam in one embodiment of this invention;

FIGURE 6 is a partial view of a scan frame similar to that shown in FIGURE 4 but showing the image pattern resulting in a scan frame when the electron beam is altered in accordance with an embodiment of the present invention and;

FIGURE 7 illustrates an approximation of the view shown in FIGURE 6.

Figure 1:
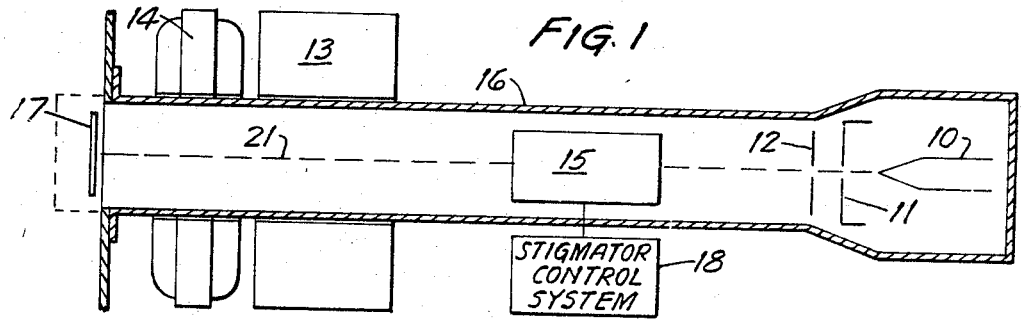
FIGURE 1 is a diagrammatic illustration, partially in cross-section, of an electron gun assembly suitable for use in practicing the present invention.

Turning to FIGURE 1 there is illustrated one embodiment of an electron gun assembly suitable for use in practicing the present invention. Such gun employs a conventional beam generating means, here comprising a filament cathode 10, a grid 11 and an anode 12; a focusing means 13 (such as an electromagnetic lens); and a deflection means 14 (such as an electromagnetic deflection yoke). Positioned intermediately between the anode 12 and the focusing means 13 is a stigmator assembly 15 (such as an electrostatic stigmator). The entire assembly is enclosed in an evacuatable envelope or housing 16. The envelope in this embodiment also encloses a target 17 against which an electron beam generated by such assembly impinges. A stigmator control system 18 controls the operation of the stigmator assembly 15 and the combination thereof comprises a scan line masking system.

An electron gun assembly suitable for use in this invention can be designed in accordance with the parameters set forth in a reference entitled "Electron Optics" by O. Klemperer published by The Cambridge University Press in 1953. Such an electron gun assembly is adapted to generate an electron beam, modulate same with a video-type input signal, and scan same in raster patterns composed of scan lines which are generally spaced from but parallel to one another. The raster pattern is formed on or over the beam target area by input synchronization signals and input blanking signals. Raster patterns are composed of scan lines in some sort of regular arrangement (e.g. horizontal, vertical or spiral).

Such a scanning, modulated electron beam may be used for recording information bits. These bits are contained in or represented by a video-type input signal which conveys all of the information present in the original modulation (typically though not necessarily an image). The bandwidth of the modulation signal is a measure of the information content of the video-type input signal. The information contained within the input signal has a predetermined relationship established by accompanying synchronizing signals and blanking pulses.

The target area 17, as a practical matter, can consist of a fluorescent layer on a glass window, an electron-sensitive imaging material, such as a silver halide emulsion, layered over a supporting substrate, or other conventional electron responsive surface.

The stigmator assembly 15 provides a means for changing the shape of the spot of an electron beam 21 in the assembly of FIGURE 1. Stigmators have been heretofore used to correct statically for departures from cross-sectionally circular beam shapes caused by gun alignment errors, asymmetry of limiting apertures, non-homogeneities in magnetic lenses, or the like. A discussion of stigmators and operation thereof is set forth in a reference entitled "The Electrostatic Stigmator, A Corrective for Astigmatic Electron Lenses" by O. Rang (from the South German Laboratories in Mosbach) appearing in volume 5 of Optics published in 1949. The stigmator by an appropriate exterior circuit applies a field to a beam as to correct for such departures from cross-sectionally circular shape. Such corrections are usually brought about by generating symmetrical voltages which can vary the amplitude and the rotation of the correcting voltage applied to a stigmator assembly so that the result is to make a static correction in beam shape. Such static corrections can also be employed in practicing the present invention.

In accordance with this invention, it is preferred to cause periodic enlargement of an electron beam modulated with a video-type input signal, such that the enlargement can be uniform, for example, the enlargement of individual scan line of a raster pattern. Each such enlargement can be uniform, for example, the enlargement of a beam can be accomplished so that the cross-sectional area of the beam remains substantially circular. It is, however, convenient and preferred for purposes of this invention to alter a scanning beam such that enlargement occurs more in a direction normal to a scan than in a direction parallel thereto, but at the same time it is also preferred to contract the diameter of a beam in a direction relative to the direction of a scan line, that is to alter the beam from a circular to an elliptical cross-section.

The preferred beam enlargements may be better understood by reference to FIGURE 5 where there is illustrated cross-sectional areas of an electron beam produced by the embodiment of the present invention. The beam is normally cross-sectionally circular as shown in FIGURE 5A and when a negative pulse is applied to the stigmator assembly 15, the beam has the appearance shown in FIGURE 5B. When an equal but opposite charge is placed on the stigmator, the beam assumes the cross-sectional shape shown in FIGURE 5C.

Figure 2:
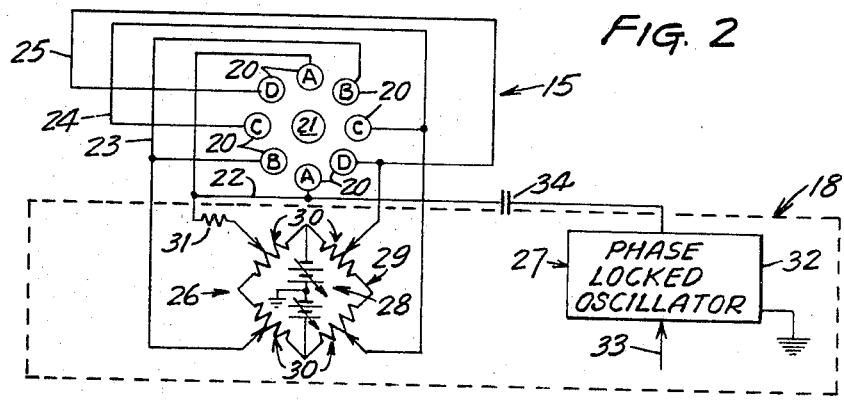
FIGURE 2 is a block and partial schematic diagram illustrating one embodiment of a means for practicing the system of the present invention.

Referring to FIGURE 2, there is illustrated an embodiment of a stigmator assembly and control system of the present invention. The stigmator assembly 15 is shown in a diagrammatic illustration and the stigmator control system 18 is illustrated by means of a partial block and a partial schematic diagram. The stigmator assembly 15 may comprise a plurality of spaced parallel conductive rods or stigmator bars 20 arranged to describe a cylinder having a circular cross-section with the path of an electron beam 21 passing along the axis. In this embodiment, eight individual stigmator bars 20 are used to selectively change the shape of the spot of a modulated electron beam 21. Stigmator bars disposed oppositely to each other are electrically connected together by conductors, and common stigmator bars 20 are identified by the same letter. In this embodiment, bars AA, BB, CC and DD are electrically connected together by conductors 22, 23, 24 and 25 respectively.

The stigmator control system 18 comprises a static stigmator control section designated generally as 26 and a dynamic stigmator control section designated generally as 27. Static stigmator control 26 comprises a balanced D.C. source 28 connected across a resistor matrix 29. Resistor matrix 29 comprises a plurality of potentiometers designated as 30. Each potentiometer has an output which connects to one of the conductors 22–25. However, the output from one potentiometer 30 to conductor 22, which conductor interconnects stigmator bars AA, has a resistor 31 connected in series therewith. The resistor 31 may be large, in the order of one megohm, since the resistance thereof will not effect the electrostatic operation of the static stigmator control 26. The static stigmator control 26, by means of the potentiometers 30, applies a D.C. electric potential to each pair of stigmator bars 20 to produce an electrostatic field having components generally perpendicular to the path of the electron beam to urge the electron beam bundle 21 in a generally circular cross-section which is as symmetrical as possible.

The dynamic stigmator control 27 includes a phase locked high frequency oscillator 32 having an input 33 which may be, for example, derived from horizontal synchronizing pulse associated with a composite video signal applied as an input to the electron gun. The oscillator 32 is connected to one pair of the stigmator bars, for example stigmator bars AA, via a coupling capacitor 34 which couples the high frequency signals via conductor 22 to stigmator bars AA when properly phase locked by a horizontal synchronizing pulse. It is anticipated that an oscillator other than a phase locked oscillator 32 may be coupled to stigmator bars AA or to any other stigmator bars. The advantage of using a phase locked oscillator in the preferred embodiment is to establish a symmetrical pattern between scan lines as illustrated in FIGURE 6.

Phase locked oscillator 32 must be capable of generating a waveform whose frequency is at least as large as the bandwidth associated with the video-type input signal used to modulate the electron beam generated by an electron gun assembly, for example of the type shown in FIGURE 1. Conventional composite video signals have a bandwidth in the order of 4 to 5 megacycles. Therefore, one would use a high frequency oscillator capable of generating at least a 4 to 5 megacycle waveform. It is preferred for purposes of this invention to employ an oscillator frequency which is at least twice as large as the bandwidth associated with the input modulation signal. For example, using the illustration of conventional composite video signals, it is preferred to use a high frequency oscillator having the capacity to produce an 8 to 10 megacycle waveform.

In the embodiment illustrated in FIGURE 2, an electrostatic stigmator assembly is employed. An electrostatic stigmator assembly is preferred for use in the present invention since an electrostatic stigmator assembly is operable at high frequencies. However, it is anticipated that an electromagnetic stigmator assembly can be used in place of an electrostatic assembly.

Figure 3:
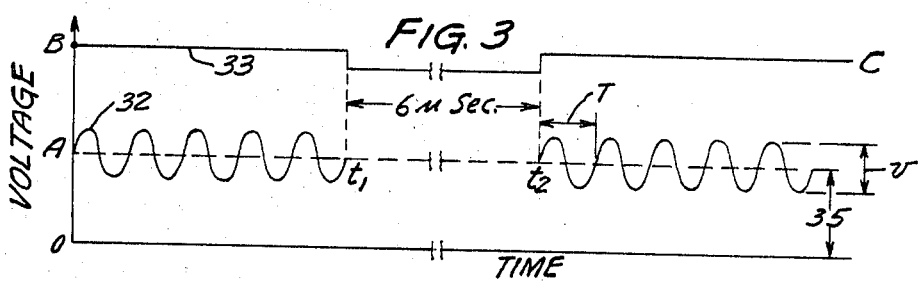
FIGURE 3 is a graph of waveforms applied to and controlling a stigmator assembly in the electron gun assembly of FIGURE 1.

Referring now to FIGURE 3, waveform A illustrates the output from phase locked oscillator 32 under control of a horizontal synchronizing pulse 33. The high frequency output signal of the phase locked oscillator 32 is applied via coupling capacitor 34 to stigmator bars AA and is impressed upon a D.C. bias 35 established by a conventional D.C. source 28 and the resistor matrix 29 of the static stigmator control 26. The phase locked oscillator 32 produces its high frequency output signal of a selected amplitude except when clamped by a horizontal synchronizing pulse illustrated as waveform B in FIGURE 3. The horizontal synchronizing pulse 33 has a duration of, for example, six microseconds in a typical composite video signal. The leading edge of horizontal synchronizing pulse 33 occurs at a time $t_1$, and in approximately six microseconds its trailing edge occurs at a time $t_2$. At time $t_1$, phase locked oscillator 32 is clamped off such that it cannot produce its high frequency signal output. At time $t_2$, which corresponds to the time the trailing edge of the horizontal synchronizing pulse occurs, the phase locked oscillator 32 is unclamped and the high frequency output signal is applied to stigmator bars AA.

The high frequency output signal from oscillator 32 has a time period T, and during this time period the high frequency signal causes periodic enlargements or maximum and minimum variations in widths about the center of each scan line scanned by the beam 21. These enlargements or maximum and minimum variations in width are in effect periodic defocusing of the electron beam spot. The high frequency signal when applied to stigmator bars AA, for example, operates to vary the components of the electrostatic field produced by bars AA to urge the electron beam from its generally circular shape or cross-section into a generally elliptical shape or cross-section as shown in FIGURE 5. The difference in length between the major and minor axis of the elliptical cross-section is a function of the high frequency signal amplitude and the frequency at which the elliptical cross-section is produced is proportional to the frequency of the high frequency signal.

Such a high frequency alternating signal of controlled amplitude and frequency, which when impressed on the stigmator assembly 15 by the oscillator 32, causes the beam to be systematically aberrated. Such aberration is in the form of rapid changes in beam spot as a scan line is generated. The situation can be understood by reference to FIGURE 6.

Referring now to FIGURE 6, the condition of the unmodulated spot (e.g. when the A.C. voltage is zero) is illustrated by the relatively contracted dense area or minimum variation in width about the center of the scan line 41. When the spot has been modulated by the positive voltage portion of the high frequency signal, the spot has a larger diameter and produces a scan track such as illustrated by points 42 in FIGURE 6. On the other hand, when the spot is modulated by the negative voltage portion of the high frequency signal (which is opposite to the positive voltage portion), the spot has the appearance as shown at points 43 in FIGURE 6. Points 42 and points 43 correspond to a condition of spot defocusing or maximum variation in width about the center of the scan line and as a consequence the electron beam is less dense in these areas as well as being of larger diameter compared to the minimum variation in width about the center of the scan line 41.

Figure 8:
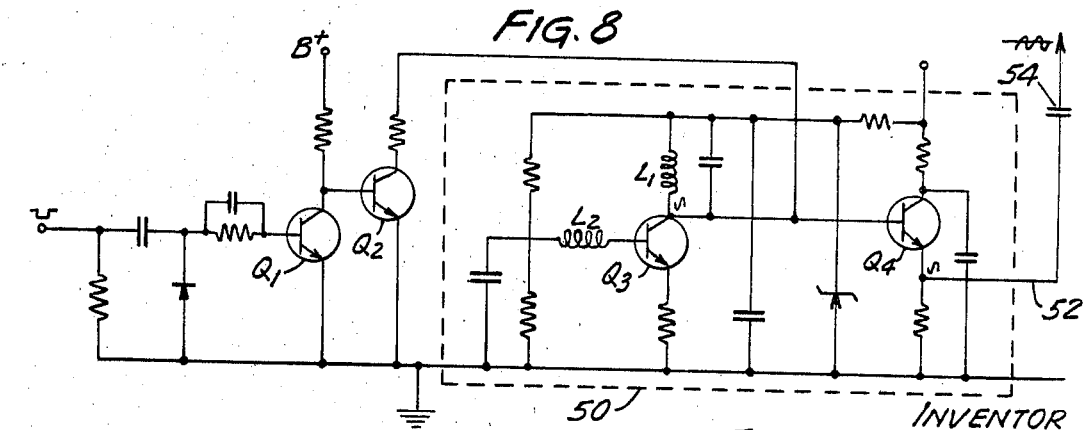

In order to cause the second scan track (for example B in FIGURE 6) to have dense areas 41′ located adjacent dense areas 41, scan line A of FIGURE 6, it is desirable to phase lock oscillator 32. Thus, the selective altering of the cross-section of the electron beam associated with scan line B will be in phase with that of scan line A so that dense portions 41 and 41′ in adjacent scan lines A and B are generally normal to one another. If the cross-section altering of the beam during each scan line was out of phase, the image produced would appear distorted. Suitable phase locking of a high frequency oscillator is accomplished by starting the oscillator at the beginning of each line. When such phase locking is employed, the second scan line B is traced after scan line A as shown in FIGURE 6 and a succeeding scan line C is traced after scan line B as shown in FIGURE 6. FIGURE 8 is a schematic diagram of a phase locked oscillator which may be used in practicing this invention. It is anticipated, however, that an oscillator other than a phase locking oscillator could be used for practicing this invention.

As illustrated in FIGURE 6, successive scan lines have a slight tendency to overlap in areas 44. This overlap area is lighter in density than the density associated with the areas 41 owing to the fact that the density of the beam at points 42 and 43, respectively, is so slight that even the additive effect by the overlap does not produce in the regions 44 a density equivalent to that in the regions 41.

FIGURE 7 is an approximation of the view of FIGURE 6 and illustrates a pattern characteristic of the scan lines produced in accordance with the scan line masking system of the present invention. The spots 46 are in reality neither circular nor sharply defined. The spots 46 merely represent those uniformly spaced areas of greatest density 41 of FIGURE 6.

FIGURE 8 is a schematic diagram of the electronic circuitry of the phase locked oscillator 32. Briefly, horizontal synchronizing pulses are applied through a conventional input network to a squaring amplifier comprising transistors Q1 and Q2 which are conductive and non-conductive respectively between horizontal synchronizing pulses. The collector of transistor Q2 controls the operation of the high frequency oscillator designated generally as 50. Oscillator 50 comprises a transistor Q3 operatively connected to inductors L1 and L2 which cooperate with the stray capacitance between the collector and base of transistor Q3 making an eight megacycle oscillator. The collector of transistor Q2 is connected to the collector of transistor Q3 to stop oscillation of transistor Q3 during the interval of a horizontal synchronizing pulse by connecting said collector of transistor Q3 to ground during the horizontal synchronizing interval. The high frequency signals produced by transistor Q3 is applied to a transistor Q4 connected as an emitter follower. An output conductor 52 is connected to the emitter of transistor Q4 and applies the received high frequency signals, via a capacitor 54, to the stigmator bars.

In operation, each horizontal synchronizing pulse makes transistor Q1 non-conductive and transistor Q2 conductive. When transistor Q2 is conductive, the collector of transistor Q3 is connected to ground through transistor Q2 thereby inhibiting operation of the oscillator 50. At the end of each horizontal synchronizing pulse, the collector of transistor Q3 is ungrounded and begins to oscillate. The high frequency signals produced by transistor Q3 are applied to transistor Q4 by means of conductor 52 and capacitor 54, the high frequency signals are coupled to the stigmator bars to vary the cross-sectional area and the focus of the electron beam. Thus, the horizontal synchronizing pulses operate to phase lock the operation of the high frequency oscillator such that the high frequency signals are produced at the start of each horizontal scan line insuring that the dense portions of each scan line are in phase and each scan line is masked so as to appear to be comprised of a plurality of regularly spaced dots and the pattern of dots appearing on each horizontal scan line are aligned.

Having thus described a preferred embodiment of the scan line masking system, it is to be understood that various modifications will be apparent to one having ordinary skill in the art, and all such changes are contemplated as may come within the scope of the appended claims.

What is claimed is:

1. In a scan line masking system for use in an electron gun assembly adapted to generate an electron beam and scan the beam in a scan pattern composed of scan lines over a beam target area in response to synchronizing signals, an improvement comprising
    (a) means located in the electron gun assembly between the beam generating means and the beam target area for changing the cross-sectional shape of the electron beam a plurality of times during each scan line; and
    (b) control means adapted to be connected to a source of control signals and operatively coupled to said changing means for controlling said changing means to change said cross-sectional shape of the electron beam in response to said control signals.

2. In a scan line masking system for use in an electron gun assembly adapted to generate an electron beam and scan the beam in a scan pattern composed of scan lines over a beam target area in response to synchronizing signals and further adapted for modulation of the beam by a video type input signal, an improvement in the system for eliminating the median between scan lines which comprises
    (a) means located in the electron gun assembly between the beam generating means and the beam target area for changing the cross-sectional shape of the electron beam a plurality of times during each scan line;
    (b) an oscillator capable of generating a high frequency signal having a frequency at least equal to the bandwidth of the video type signal; and
    (c) means operatively coupled to said changing means and said oscillator for applying said high frequency signal to said changing means such that said cross-sectional shape of the modulated electron beam is changed as a function of said high frequency signal during each scan line to produce a scan pattern having the appearance of a plurality of regularly spaced spots.

3. The scan line masking system of claim 2 including
    (d) means operatively coupled to said oscillator for phase locking generation of said high frequency signal with the beginning of each scan line such that adjacent scan lines have their spots aligned with one another in a generally normal direction relative to each scan line.

4. The scan line masking system of claim 1 wherein said changing means periodically changes said shape of the spot of the modulated beam a plurality of times during a scan line.

5. A method for making a new and useful scan pattern for eliminating the median line between scan lines comprising
    (a) generating an electron beam;
    (b) directing said electron beam along a path to bombard a target;
    (c) scanning said beam on said target in a plurality of substantially parallel scan lines;
    (d) changing the cross-sectional width of the electron beam in a direction normal to the scan line a plurality of times during each scan line.

6. The method of claim 5 comprising periodically changing the cross-sectional width of the beam a plurality of times during a scan line.

7. The method of claim 6 including phase locking the periodically changing cross-sectional width of the modulated beam with the beginning of each scan line such that adjacent scan lines have their changes in cross-sectional widths aligned with one another in a generally normal direction relative to each scan line.

8. Apparatus for selectively changing the shape of the spot of a modulated electron beam being directed along a predetermined path, comprising,
    (a) a stigmator assembly positioned around said electron beam and said path, said stigmator assembly comprising a plurality of symmetrically positioned pole pairs wherein the poles of each pair are disposed on opposite sides of the path from one another;
    (b) means operatively connected to and for energizing said stigmator assembly to produce a field having components generally perpendicular to said path for urging the spot of said electron beam into a generally circular shape; and
    (c) means operatively coupled to part of the pole pairs of said stigmator assembly for applying a high frequency signal of a selected amplitude to vary the components of the field produced by said stigmator assembly for urging said spot of the electron beam from said generally circular shape into a generally elliptical shape wherein the difference in length between the major and minor axis of said elliptical shape is a function of said selected amplitude and the frequency at which said elliptical shape is produced is proportional to the frequency of said high frequency signal.

9. Apparatus for selectively changing the shape of the spot of a modulated electron beam being directed along a predetermined path and being scanned over a beam target in a pattern composed of scan lines in response to synchronizing signals, comprising
    (a) a stigmator assembly positioned around said electron beam and said path;
    (b) means operatively connected to and for energizing said stigmator assembly to produce a field having components generally perpendicular to said path for urging the spot of said electron beam into a generally circular shape; and
    (c) means operatively coupled to said stigmator assembly for applying a high frequency signal of a selected amplitude to vary the components of the field produced by said stigmator assembly for urging said spot of the electron beam from said generally circular shape into a generally elliptical shape wherein the difference in length between the major and minor axis of said elliptical shape is a function of said selected amplitude and the frequency at which said elliptical shape is produced is proportional to the frequency of said high frequency signal, the said high frequency signal applying means comprising
        (1) an oscillator for producing high frequency signals of said selected amplitude, and
        (2) means operatively coupled to said oscillator and responsive to the synchronizing signals for phase locking said oscillator to said synchronizing signals such that said oscillator commences operation at the beginning of each scan line and ceases operation at the end of each scan line such that each scan line is composed of a plurality of regularly spaced dots being vertically aligned with adjacent scan lines.

References Cited

UNITED STATES PATENTS

| | | | |
|---|---|---|---|
| 2,784,342 | 3/1957 | Overbeek | 315—27 X |
| 2,884,559 | 4/1959 | Cooper et al. | 315—31 |
| 2,973,433 | 2/1961 | Kramer | 315—31 X |

OTHER REFERENCES

Grivet, Electron Optics, 1965, pp. 433–36.

RICHARD A. FARLEY, *Primary Examiner.*

MALCOLM F. HUBLER, *Assistant Examiner.*

U.S. Cl. X.R.

313—83